United States Patent
Hotta et al.

(10) Patent No.: US 9,692,064 B2
(45) Date of Patent: Jun. 27, 2017

(54) FUEL CELL SYSTEM

(71) Applicants: Yutaka Hotta, Toyota (JP); Michitaro Itoga, Okazaki (JP)

(72) Inventors: Yutaka Hotta, Toyota (JP); Michitaro Itoga, Okazaki (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 222 days.

(21) Appl. No.: 14/403,270

(22) PCT Filed: Feb. 26, 2013

(86) PCT No.: PCT/JP2013/054999
§ 371 (c)(1),
(2) Date: Nov. 24, 2014

(87) PCT Pub. No.: WO2013/179704
PCT Pub. Date: Dec. 5, 2013

(65) Prior Publication Data
US 2015/0111116 A1   Apr. 23, 2015

(30) Foreign Application Priority Data
Jun. 1, 2012 (JP) .................................. 2012-125923

(51) Int. Cl.
*H01M 8/2485* (2016.01)
*H01M 8/2484* (2016.01)
(Continued)

(52) U.S. Cl.
CPC .... *H01M 8/04097* (2013.01); *H01M 8/04201* (2013.01); *H01M 8/2465* (2013.01)

(58) Field of Classification Search
None
See application file for complete search history.

(56) References Cited

U.S. PATENT DOCUMENTS

2011/0079455 A1*  4/2011  Katano ................. B60K 1/04
                                                       180/65.31

FOREIGN PATENT DOCUMENTS

| JP | 2008-171655 A | | 7/2008 | |
| JP | 2010/186730 | * | 8/2010 | .............. H01M 8/04 |
| JP | 2010-186730 A | | 8/2010 | |

OTHER PUBLICATIONS

English translation of JP 2010/186730 (2010).*

* cited by examiner

*Primary Examiner* — Yoshitoshi Takeuchi
(74) *Attorney, Agent, or Firm* — Andrews Kurth Kenyon LLP (57) ABSTRACT

A fuel cell system according to the present invention comprises a fuel gas supply system that supplies a fuel gas from a fuel supply source to a fuel cell that includes a stack including a plurality of cells, and a fuel off-gas circulation system that resupplies fuel off-gas to the stack. The fuel off-gas circulation system includes: a mixed fuel gas flow path formed such that a mixed fuel gas containing the fuel off-gas and the fuel gas flows in a direction along an inner surface of a manifold installed in the stack; and a point of merger where the fuel off-gas and the fuel gas merge with each other to produce the mixed fuel gas, the point of merger being arranged on one surface side of the manifold. With such configuration, the heat exchange efficiency of the fuel off-gas and the fuel gas can be increased, and ice resulting from water in the fuel off-gas can be prevented from flowing into the fuel cell stack.

9 Claims, 7 Drawing Sheets

(51) Int. Cl.
*H01M 8/24* (2016.01)
*H01M 8/04298* (2016.01)
*H01M 8/04014* (2016.01)
*H01M 8/04007* (2016.01)
*H01M 8/04089* (2016.01)
*H01M 8/04082* (2016.01)
*H01M 8/2465* (2016.01)

FUEL CELL SYSTEM

CROSS-REFERENCE TO RELATED APPLICATIONS

This is a national phase application based on the PCT International Patent Application No. PCT/JP2013/054999 filed Feb. 26, 2013, claiming priority to Japanese Patent Application No. 2012-125923 filed Jun. 1, 2012, the entire contents of both of which are incorporated herein by reference.

TECHNICAL FIELD

The present invention relates to a fuel cell system.

BACKGROUND ART

In recent years, fuel cell systems which employ, as an energy source, a fuel cell that generates electric power through electrochemical reaction between a fuel gas (an anode gas) and an oxidant gas (a cathode gas) have been increasingly attracting attention. One known example of fuel cells used in such fuel cell systems has a fuel cell stack in which a plurality of unit cells are stacked, with the fuel cell stack being sandwiched by end plates arranged on both ends in the cell-stacking direction of the fuel cell stack.

Some of these fuel cell systems may comprise a fuel gas circulation system (circulation passage) for returning a fuel off-gas (hydrogen off-gas) discharged from the fuel cell stack and resupplying it to the fuel cell stack in order to efficiently use a fuel gas such as hydrogen gas. For example, the applicant has proposed a fuel cell system in which, for the purpose of preventing water contained in the fuel off-gas from freezing at a point of merger between the fuel off-gas and a newly-supplied fuel gas and allowing easy arrangement of auxiliary machines along a fuel off-gas circulation passage, the point of merger and a part of the fuel off-gas circulation passage are provided in end plates (see Patent Document 1, etc.).

RELATED ART DOCUMENT

Patent Document

Patent Document 1: JP2008-171655 A

DISCLOSURE OF THE INVENTION

Problem to be Solved by the Invention

In general, fuel cell systems require a high cooling capacity since the amounts of heat generated by the body of the fuel cell stack and the auxiliary machines are larger than, for example, those of internal combustion engine systems. In order to satisfy such requirement, it is desired to increase the exchange efficiency of heat generated by the fuel cell stack to a maximum extent. On the other hand, in the fuel cell system described in Patent Document 1, since the point of merger between the fuel off-gas and the new fuel gas is provided in a manifold, the fuel off-gas that has already been heated to a relatively high temperature is further heated by heat generated by the fuel cell stack and, thus, it cannot be said that the heat exchange efficiency thereof is sufficiently high.

In addition, since the distance from the point of merger between the fuel off-gas and the new fuel gas to the fuel cell stack in the configuration of the fuel cell system in Patent Document 1 is short, if water contained in the fuel off-gas freezes at the point of merger and produces ice, the ice will possibly be introduced into the fuel cell stack.

The present invention has been made in light of such circumstances and an object of the present invention is to provide a fuel cell system which is capable of improving the heat exchange efficiency during the supply of the circulated and resupplied fuel off-gas and the new fuel gas to the body of the fuel cell stack and capable of preventing, even if water in the fuel off-gas freezes and produces ice, the ice from entering the fuel cell stack.

Means for Solving the Problem

In order to solve the problems set forth above, a fuel cell system according to the present invention comprises: a fuel cell that includes a stack body including a plurality of cells for generating electric power through electrochemical reaction between a fuel gas and an oxidant gas; a fuel gas supply system that supplies the fuel gas from a fuel supply source to the stack body; and a fuel off-gas circulation system that resupplies to the stack body a fuel off-gas discharged from the stack body, wherein the fuel off-gas circulation system includes: a mixed fuel gas flow path formed such that a mixed fuel gas containing the fuel off-gas and the fuel gas flows in a planar direction of an inner surface of a substantially plate-like manifold installed in the stack body; and a point of merger where the fuel off-gas and the fuel gas merger with each other to produce the mixed fuel gas, the point of merger being arranged on one surface side (e.g., an outer surface side of the manifold, i.e., a side opposite to the surface in which the mixed fuel gas flow path is formed).

In the fuel cell system having the above configuration, the fuel off-gas discharged from the stack body is mixed with a newly-supplied fuel gas at the point of merger and the resulting mixed fuel gas flows into the mixed fuel gas flow path and flows in a direction along the inner surface of the manifold to thereby flow through the stack body. In such process, since the fuel off-gas at a relatively high temperature and the fuel gas at a relatively low temperature are mixed together, the temperature of the mixed fuel gas generated at the point of merger is lower than the temperature of the fuel off-gas. By allowing such mixed fuel gas to flow in the manifold, a larger amount of heat generated in the stack body can be removed as compared to the configuration in which the fuel off-gas, which has not yet been merged with the fuel gas, flows in the manifold. As a result, the heat exchange efficiency can be increased and water contained in the fuel off-gas can be prevented from freezing more reliably, as compared to the related art.

Since the mixed fuel gas obtained at the point of merger flows, after passing the point of merger, in the direction along the inner surface of the manifold, it becomes easier to allow the mixed fuel gas flow path to extend in a large (long) distance. Thus, even if ice originating from the water in the fuel off-gas is produced in the mixed fuel gas flow path, the ice can be melted relatively easily before the mixed fuel gas reaches the stack body.

More specifically, the mixed fuel gas flow path may be defined between the manifold and a terminal arranged adjacent to the manifold. With such configuration, since it becomes easier to form the mixed fuel gas flow path so as to extend like a pipe being laid in the planar direction, it becomes easier for the mixed fuel gas flowing in the mixed fuel gas flow path to be heated further and more directly by the heat generated in the stack body. In addition, since the temperature between the manifold (e.g., a stack manifold) and the terminal is close to the temperature of the cell (i.e., a high temperature), water originating from the fuel off-gas contained in the mixed fuel gas can be prevented from freezing more reliably. It should be noted that the "terminal," as used herein, refers to a member that is, for example, installed on an end of the stack and includes: an electrical connection for extracting electric power generated by the stack to the outside thereof; and a flat surface portion being in contact with the cells for collecting electric power and having a breadth equal or substantially equal to that of the cells.

In this case, it is preferable for the mixed fuel gas flow path to be formed between: a coolant exit flow path which is provided in the manifold and through which a coolant, having been supplied to the stack body, is discharged out of the stack body; and an oxidant gas exit flow path which is provided in the manifold and through which the oxidant gas, having been supplied to the stack body, is discharged out of the stack body. In such configuration, since temperatures at the coolant exit and the oxidant gas exit tend to be higher than the temperature of the other portion due to exhaust heat from the stack body, the freezing-prevention effect of the water contained in the mixed fuel gas can be further enhanced.

It may be possible to even more reliably prevent the water originating from the fuel off-gas contained in the mixed fuel gas from freezing by providing the point of merger in the vicinity of the manifold.

The fuel off-gas circulation system may include a pump for circulating the fuel off-gas and the point of merger may be provided downstream from a pump chamber exit in a housing of the pump. In this case, the freezing-prevention effect of the water originating from the fuel off-gas contained in the mixed fuel gas can further be enhanced due to heat conducted from a motor of such fuel off-gas circulation pump.

It is preferable for the mixed fuel gas flow path to extend from a portion corresponding to a central part of the stack body to a fuel gas entry flow path provided on an edge of the manifold. It should be noted that there may be one stack body (i.e., a so-called one-stack structure) or more than one stack body (e.g., two-stack structure), and if the stack body is constituted by a required number of cells connected in series (i.e., if there is one stack) the "central part of the stack body" may be restated as "the central part of the cells." Typically, the temperature of an area facing the cells and the stack body, in particular an area facing the central part of the cells and the stack body, becomes higher than that of a circumferential part. Thus, by introducing the mixed fuel gas from the portion corresponding to the central part of the stack body into the stack body, it is possible to further enhance the freezing-prevention effect of the water originating from the fuel off-gas contained in the mixed fuel gas.

It is also possible to employ a configuration in which the pump for circulating the fuel off-gas is connected directly to the manifold (without a pipe, etc. therebetween). With such configuration, since a connecting member, such as a pipe or a relay member, does not have to be provided between the pump and the manifold, the mountability can be greatly improved.

Furthermore, it is preferable for an entry for the fuel off-gas to enter the pump and an exit for the mixed fuel gas to exit from the pump to be arranged in a vertical line or a substantially vertical line. A specific example of such configuration would be a configuration in which a motor shaft of a pump to be installed in the manifold is arranged horizontally and the pump chamber entry and the pump chamber exit for the fuel off-gas are arranged on the upper and lower sides thereof in the vertical direction. In this case, the vertical positional relationship between the pump chamber entry and the pump chamber exit is not particularly limited. However, it is preferable, in consideration of the smooth distribution of the fuel off-gas, to arrange the pump chamber entry on the lower side and the pump chamber exit on the upper side. With such configuration, it is possible to effectively prevent water produced as a result of condensation of water vapor in the fuel off-gas from being retained in the flow path for the fuel off-gas in the pump. Accordingly, it is possible to enhance the performance of draining water from the pump chamber after the pump is stopped.

More specifically, the mixed fuel gas flow path may be formed such that its lowermost surface is located lower than the lowermost surface of the pump chamber exit flow path of the pump in the vertical direction.

Alternatively, the mixed fuel gas flow path may be formed such that its lowermost surface is located lower than the lowermost surface of a mixed fuel gas entry flow path in the vertical direction, the mixed fuel gas entry flow path being provided in the manifold in order to supply the mixed fuel gas to the stack body. With such configuration, it is possible to prevent fluid droplets (water droplets) from entering, from the mixed fuel gas flow path, the pump chamber of the pump and the cells of the stack body.

Effect of the Invention

As described above, according to the present invention, it is possible to significantly increase the heat exchange efficiency during the process of mixing the fuel off-gas and the new fuel gas and supplying the resulting gas to the fuel cell stack body of the fuel cell and also possible to more reliably prevent, even if the water in the fuel off-gas freezes and produces ice, the ice from flowing into the stack body

BEST MODE FOR CARRYING OUT THE INVENTION

An embodiment of the present invention will be described in detail below. It should be noted that the following embodiment is an example for illustrating the present invention and is not intended to limit the present invention to such embodiment. Various modifications may be made to the present invention without departing from the gist thereof.

Figure 1:
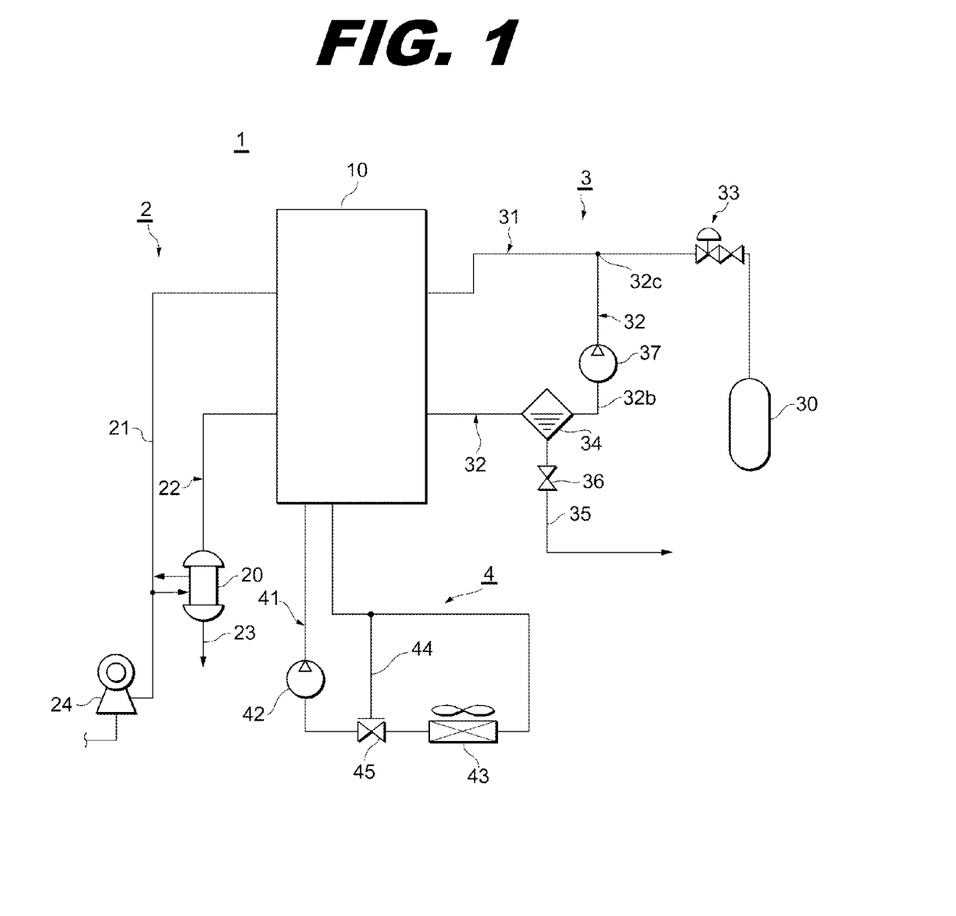
FIG. 1 is a system configuration diagram showing a preferred embodiment of a fuel cell system according to the present invention.

FIG. 1 is a system configuration diagram showing a preferred embodiment of a fuel cell system according to the present invention. A fuel cell system 1 in FIG. 1 may be applied to in-vehicle power generation systems installed in vehicles such as fuel cell vehicles, power generation systems for various types of movable bodies (e.g., boats, ships, airplanes, trains and walking robots) and stationary power generating systems used as power generating facilities for construction (e.g., for houses and buildings). The following description will specifically describe a fuel cell system to be used for automobiles.

The fuel cell system 1 includes a fuel cell having, for example, one fuel cell stack 10 (stack body), in which a required number of unit cells are stacked, the unit cell receiving supply of an oxidant gas and a fuel gas and generating electric power through electrochemical reaction therebetween. The fuel cell system 1 also includes: an oxidant gas supply system 2, being a cathode system, which adjusts the supply of air as the oxidant gas to the fuel cell stack 10; a fuel gas supply system 3, being an anode system, which adjusts the supply of hydrogen gas as the fuel gas; and a coolant supply system 4 for cooling the fuel cell stack 10.

The oxidant gas supply system 2 includes a humidifier 20, an air supply pipe 21, an air discharge pipe 22 and a discharge pipe 23. Of these components, the air supply pipe 21 supplies the air humidified by the humidifier 20 to the fuel cell stack 10. The air supply pipe 21 is provided with a compressor 24 which intakes the air from the atmosphere and compresses and feeds the air to the humidifier 20. The air discharge pipe 22 guides the air off-gas (oxidant off-gas) discharged from the fuel cell stack 10 to the humidifier 20. The discharge pipe 23 guides the air off-gas from the humidifier 20 to the outside.

The fuel gas supply system 3 includes a hydrogen tank 30, being a fuel supply source which stores a high-pressure hydrogen gas, a fuel supply pipe 31 and a circulation pipe 32. Of these components, the fuel supply pipe 31 supplies the hydrogen gas from the hydrogen tank 30 to the fuel cell stack 10. The fuel supply pipe 31 is provided with a regulator 33, having a cutoff valve, which shuts off or allows the supply of hydrogen gas from the hydrogen tank 30 and adjusts the pressure of the hydrogen gas when allowing the supply thereof.

The circulation pipe 32 returns the hydrogen off-gas (fuel off-gas) discharged from the fuel cell stack 10, via a pipe 32b, to a point of merger 32c in the fuel supply pipe 31. In this way, the fuel cell system 1 is configured such that the hydrogen off-gas and the hydrogen gas from the hydrogen tank 30 are mixed together at the point of merger 32c and the resulting mixed hydrogen gas (mixed fuel gas) is supplied through the fuel supply pipe 31 to the fuel cell stack 10.

The pipe 32b in the circulation pipe 32 is provided with a gas-liquid separator 34 for resupplying the hydrogen off-gas discharged from the fuel cell stack 10 to the fuel cell stack 10. The gas-liquid separator 34 performs gas-liquid separation of the hydrogen off-gas discharged from the fuel cell stack 10 to thereby collect a part or most of the water contained in the hydrogen off-gas.

The discharge pipe 35 connected to the gas-liquid separator 34 is provided with a discharge valve 36. The discharge valve 36 is actuated in response to an instruction from a control apparatus (not shown) and discharges (purges) the water collected by the gas-liquid separator 34 and the hydrogen off-gas containing impurities in the circulation pipe 32 to the outside via the discharge pipe 35.

The circulation pipe 32 is further provided with an electric circulation pump 37 (pump) for sucking the hydrogen off-gas in the circulation pipe 32, which has been discharged from the fuel cell stack 10, and then compressing and sending the hydrogen off-gas to the fuel supply pipe 31 to thereby adjust the circulation of the hydrogen off-gas discharged from the fuel cell stack 10. In this way, the electric circulation pump 37 functions as a pump for circulating the fuel off-gas.

As described above, the components of the fuel gas supply system 3, excluding the hydrogen tank 30, the regulator 33 having the cutoff valve, the discharge pipe 35 and the discharge valve 36, constitute a fuel off-gas circulation system.

The coolant supply system 4 includes a coolant pipe 41 that communicates with a cooling flow path in each fuel cell stack 10. The coolant pipe 41 is provided with a cooling pump 42 for circulating a coolant (e.g., cooling water) and a radiator 43 for cooling the coolant discharged from the fuel cell stack 10. A bypass pipe 44 that bypasses the radiator 43 is connected between the cooling pump 42 and the radiator 43 and a switching valve 45 for adjusting the passage of the coolant into the radiator 43 and the bypass pipe 44 is installed at the connection location of the bypass pipe 44.

Figure 2:
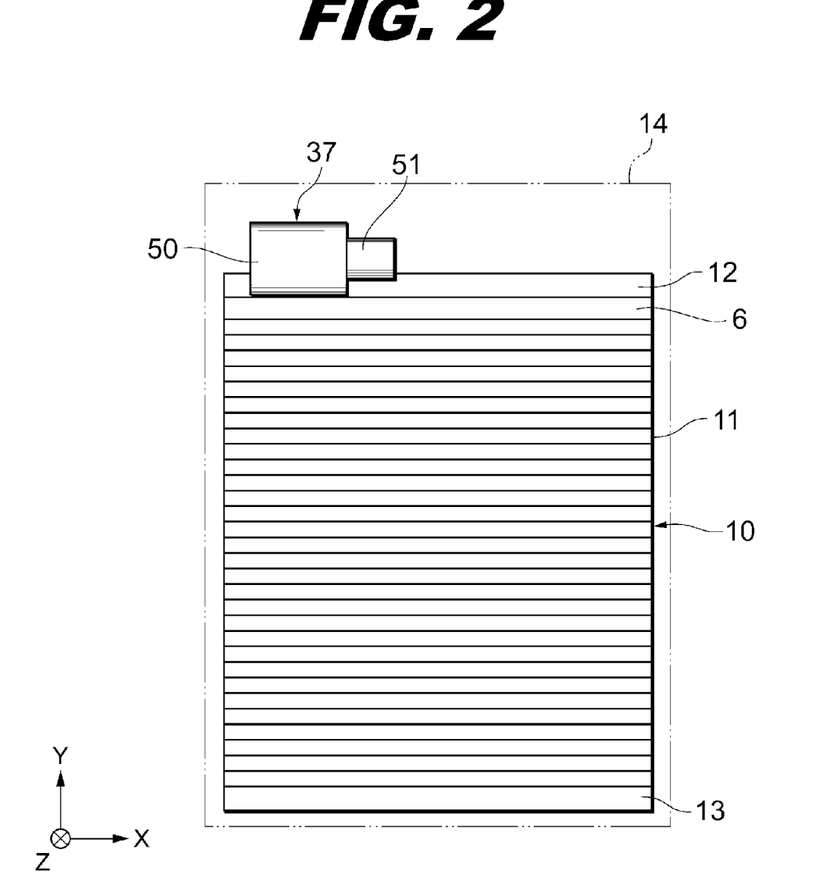
FIG. 2 is a plan view schematically showing a configuration of the fuel cell stack.

FIG. 2 is a plan view (top view) schematically showing the configuration of the fuel cell stack 10. As shown in FIG. 2, the fuel cell stack 10 is constituted by stacking a required number of unit cells 11, each generating electric power, and is sandwiched by a pair of end plates 12, 13, provided at both ends in the stacking direction, in a state in which the unit cells 11 are arranged side by side and parallel to one another in the stacking direction. The end plates 12, 13 have an elongated plate-like shape. These end plates 12, 13 are connected to each other by a tension plate or the like (not shown).

The fuel cell stack 10 sandwiched by the end plates 12, 13 is housed in, for example, a stack case 14 and then installed in a vehicle body of an automobile in a posture in which the fuel cell stack 10 is placed in a horizontal direction. The following description will be provided in reference to the posture in which the fuel cell stack 10 is installed in the above-mentioned manner, unless otherwise indicated. Specifically, the X axis indicates the horizontal direction in which the fuel cell stack 10 is installed, the Y axis indicates the horizontal direction in which the plurality of unit cells 11 are arranged side by side and the Z axis indicates the direction perpendicular to these two directions (i.e., the vertical direction) in, for example, FIG. 2 and FIGS. 3-7, which will be described later.

A stack manifold 6 (manifold) having a substantially plate-like shape is provided between one end plate 12 and the fuel cell stack 10. Of the components of the previously-mentioned fuel gas supply system 3 (a part of which also serves as the fuel off-gas circulation system as described above), a part of the circulation pipe 32, the regulator 33 having the cutoff valve, the gas-liquid separator 34, the discharge pipe 35, the discharge valve 36 and the electric circulation pump 37 are attached to the stack manifold 6 so as to be arranged at respective appropriate positions. (It should be noted that FIG. 2 only shows the electric circulation pump 37 from among those components.)

The electric circulation pump 37 includes: an electric motor 50 that receives electric power supply so as to generate rotary drive force; and a pump rotor 51 that is rotated by the drive force of the electric motor 50 so as to suck and discharge the hydrogen off-gas. The electric motor 50 and the pump rotor 51 are arranged side by side with their rotation axes coinciding with each other in the same direction, whereby they form an elongated shape in such rotation axis direction.

Figure 3:
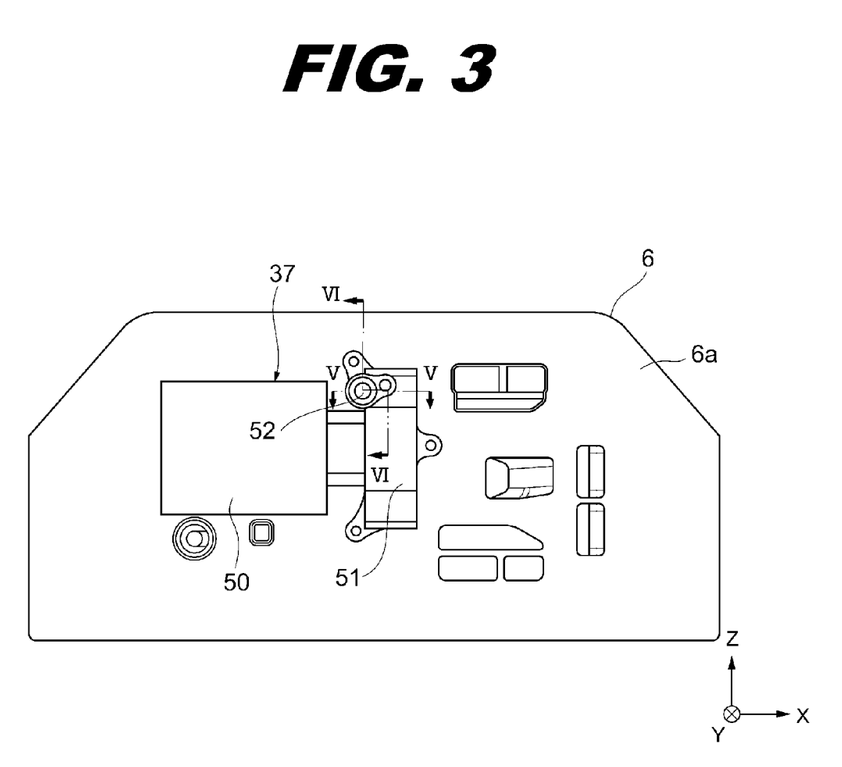
FIG. 3 is a front view showing a state in which an electric circulation pump is installed on a surface of a stack manifold.
Figure 4:
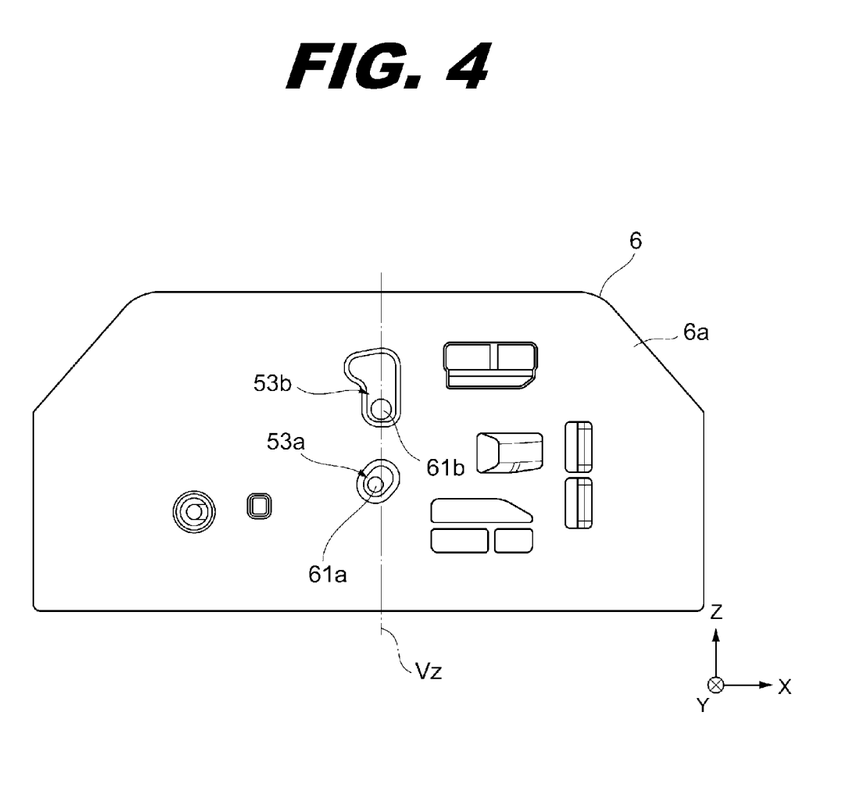
FIG. 4 is a front view showing only the surface of the stack manifold (the surface from which the electric circulation pump in FIG. 3 has been removed).

FIG. 3 is a front view showing a state in which the electric circulation pump 37 is installed on a surface 6a of the stack manifold 6. FIG. 4 is a front view showing only the surface 6a of the stack manifold 6 (in other words, the surface 6a from which the electric circulation pump 37 has been removed from the state shown in FIG. 3).

As shown in FIG. 3, the electric circulation pump 37 is directly connected to the surface 6a of the stack manifold 6 without any connecting member or any relay member such as a pipe. In addition, an inlet port 52 for the hydrogen gas 52 supplied from the hydrogen tank 30 is provided on a side wall of the pump rotor 51 of the electric circulation pump 37.

In addition, as shown in FIG. 4, the stack manifold 6 is provided, at positions corresponding to the pump rotor 51 of the electric circulation pump 37, with: an inlet port 61a for introducing the hydrogen off-gas from the fuel cell stack 10 to the pump rotor 51; and an outlet port 61b for sending toward the fuel cell stack 10 a mixed hydrogen gas (mixed fuel gas) obtained by mixing the hydrogen off-gas and newly supplied hydrogen gas in the pump rotor 51. The pump rotor 51 of the electric circulation pump 37 is provided with a pump chamber entry 53a (an entry for the fuel off-gas to enter the pump) and a pump chamber exit 53b (an exit for the mixed fuel gas to exit from the pump) (respectively indicated by arrows in FIG. 4) at positions corresponding to the inlet port 61a and the outlet port 61b, respectively.

The inlet port 61a and the outlet port 61b, as well as the pump chamber entry 53a and the pump chamber exit 53b, are arranged in a vertical line or a substantially vertical line. FIG. 4 shows an embodiment in which the pump chamber entry 53a and the inlet port 61a are arranged on the lower side and the pump chamber exit 53b and the outlet port 61b are arranged on the upper side, along a dashed line Vz defining the vertical line.

Figure 5:
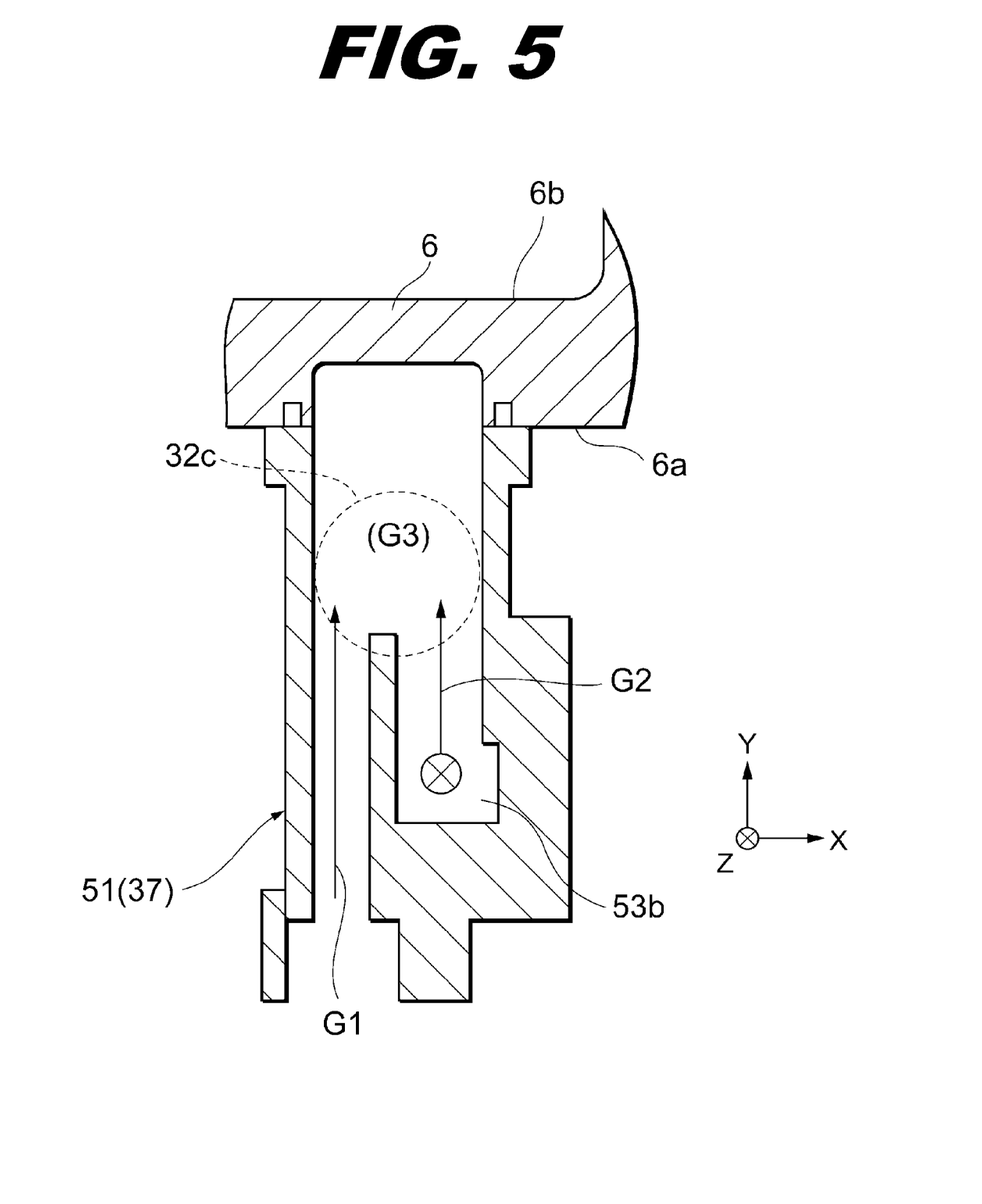
FIG. 5 is a partial sectional view schematically showing a pump rotor of the electric circulation pump, taken along the line V-V in FIG. 3.
Figure 6:
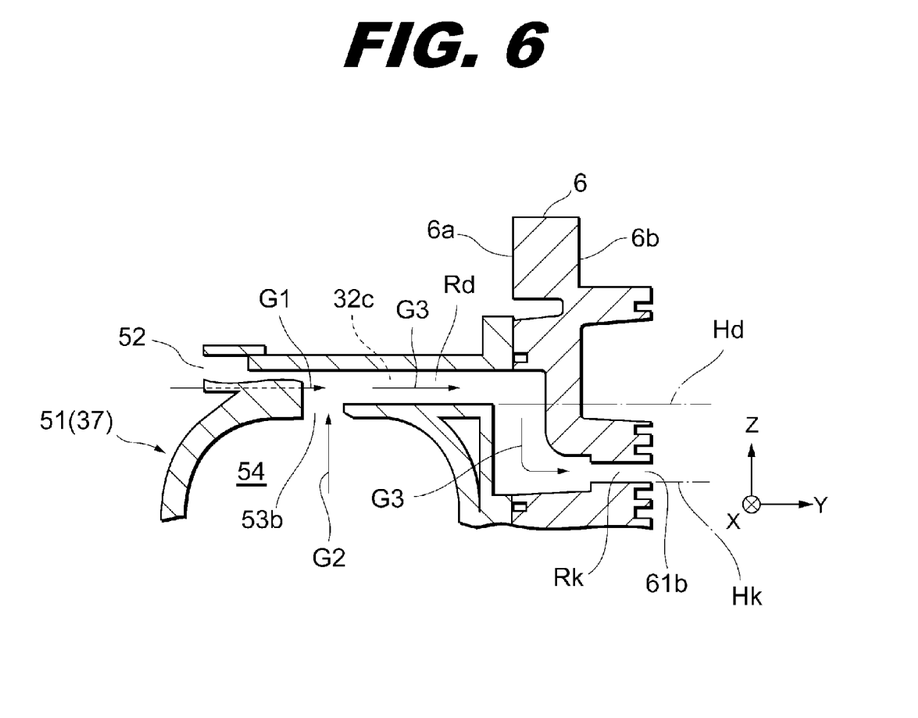
FIG. 6 is a partial sectional view schematically showing the pump rotor of the electric circulation pump, taken along the line VI-VI in FIG. 3.
Figure 7:
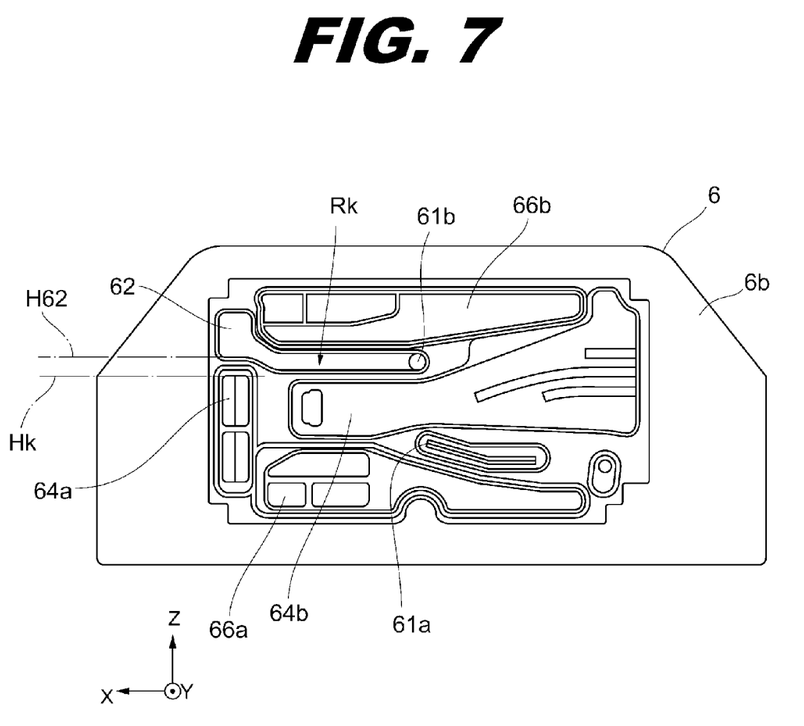
FIG. 7 is a front view showing a back surface of the stack manifold.

FIG. 5 is a partial sectional view schematically showing the pump rotor 51 of the electric circulation pump 37, taken along line V-V in FIG. 3. FIG. 6 is a partial sectional view schematically showing the pump rotor 51 of the electric circulation pump 37, taken along line VI-VI in FIG. 3. FIG. 7 is a front view showing a back surface 6b of the stack manifold 6.

As shown in FIG. 5, a hydrogen gas G1 (fuel gas) supplied by the hydrogen tank 30 and a hydrogen off-gas G2 (fuel off-gas) sent from the pump chamber exit 53b via the pump chamber 54 in the pump rotor 51 independently flow into the pump rotor 51 fixed to the stack manifold 6. The hydrogen gas G1 and the hydrogen off-gas G2 are then merged with each other downstream from the pump chamber exit 53b and mixed together, whereby the mixed hydrogen gas G3 (mixed fuel gas) is obtained.

In other words, the point of merger 32c described with reference to FIG. 1 is provided at a location in the housing of the pump rotor 51 (inside the pump chamber 54) of the electric circulation pump 37, downstream from the pump chamber exit 53b and in the vicinity of the stack manifold 6. The electric circulation pump 37 having such point of merger 32c is arranged on an outer surface (i.e., a surface 6a; an opposite surface of a back surface 6b on which a mixed fuel gas flow path Rk (to be described later) is formed) side of the stack manifold 6.

The resulting mixed hydrogen gas G3 flows through a pump chamber exit flow path Rd extending in the Y direction from the pump chamber exit 53b provided in the side wall of the pump chamber 54, flows downward, and is then introduced into the mixed fuel gas flow path Rk from the outlet port 61b of the stack manifold 6. The mixed fuel gas flow path Rk and the pump chamber exit flow path Rd are formed such that the lowermost surface of the mixed fuel gas flow path Rk (indicated by the dashed line Hk in FIG. 6) is located lower than the lowermost surface of the pump chamber exit flow path Rd (indicated by the dashed line Hd in FIG. 6) in the vertical direction.

Next, as shown in FIG. 7, the mixed fuel gas G3 introduced from the outlet port 61b toward the back surface 6b (i.e., an inner surface; a surface facing the fuel cell stack 10) side of the stack manifold 6 flows through the mixed fuel gas flow path Rk defined between the back surface 6b of the stack manifold 6 and a terminal (not shown) of the fuel cell stack 10, which is arranged so as to be adjacent to the stack manifold 6, in, for example, the horizontal direction (the X direction in FIG. 7) along the stack manifold 6. As described above, the mixed fuel gas flow path Rk is formed such that the mixed fuel gas G3 flows in a direction along the inner surface of the substantially plate-like stack manifold 6 (in the X direction on the back surface 6b) provided for the fuel cell stack 10.

The mixed fuel gas flow path Rk communicates, at the terminal end thereof, with a mixed fuel gas entry flow path 62 opened at the edge of the stack manifold 6, and the mixed hydrogen gas G3 is supplied through the opening of the mixed fuel gas entry flow path 62 into the fuel cell stack 10. In this way, the mixed fuel gas flow path Rk extends from a portion corresponding to a central part of the fuel cell stack 10 (i.e., the outlet port 61b of the stack manifold 6) to the mixed fuel gas entry flow path 62 provided at the edge of the stack manifold 6. The mixed fuel gas flow path Rk and the mixed fuel gas entry flow path 62 are formed such that the lowermost surface of the mixed fuel gas flow path Rk (indicated by the dashed line Hk in FIGS. 6 and 7) is located lower than the lowermost surface of the mixed fuel gas entry flow path 62 (indicated by the dashed line H62 in FIG. 7) in the vertical direction.

In addition, the following flow paths are formed so as to open on the stack manifold 6: a coolant entry flow path 64a for supplying the coolant from the coolant supply system 4 to the fuel cell stack 10; a coolant exit flow path 64b through which the coolant is discharged from the fuel cell stack 10; an oxidant gas entry flow path 66a for supplying an oxidant gas from the oxidant gas supply system 2 to the fuel cell stack 10; and an oxidant gas exit flow path 66b through which the oxidant gas is discharged from the fuel cell stack 10. The mixed fuel gas flow path Rk is provided between the coolant exit flow path 64b and the oxidant gas exit flow path 66b in the stack manifold 6 as shown in FIG. 7.

In the fuel cell system 1 having the above configuration, the hydrogen off-gas G2 discharged from the fuel cell stack 10 is mixed with the hydrogen gas G1 newly supplied from the hydrogen tank 30 at the point of merger 32c, whereby the mixed fuel gas G3 is obtained, as described above. The mixed fuel gas G3 flows into the mixed fuel gas flow path Rk, flows in the direction along the inner surface of the stack manifold 6, and then flows through the fuel cell stack 10. In such process, since the hydrogen off-gas G2, at a relatively high temperature, and the hydrogen gas G1, at a relatively low temperature, are mixed, the temperature of the mixed hydrogen gas G3 generated at the point of merger 32c is lower than that of the hydrogen off-gas G2.

By allowing the mixed hydrogen gas G3, which is a mixture of the hydrogen off-gas G2 and the hydrogen gas G1 and which has a relatively low temperature, to flow in the stack manifold 6, a larger amount of heat generated in the fuel stack 10 can be removed as compared to a configuration in which the hydrogen off-gas G2, which has not yet been merged with the hydrogen gas G1, flows in the stack manifold 6. As a result, it becomes possible to increase the heat exchange efficiency and to effectively prevent the water contained in the hydrogen off-gas G2 from freezing.

Since the mixed hydrogen gas G3 obtained at the point of merger 32c in the pump rotor 51 of the electric circulation pump 37 flows, after passing the point of merger 32c, in the direction along the inner surface of the stack manifold 6, it is possible to ensure that the mixed hydrogen gas flow path Rk extends in a sufficiently large (long) distance. Such configuration provides an advantage in which, even if ice originating from the water in the hydrogen off-gas G2 is produced in the mixed hydrogen gas flow path Rk, the ice can be melted relatively easily before the mixed hydrogen gas G3 reaches the fuel cell stack 10.

Since the mixed hydrogen gas flow path Rk is defined between the stack manifold 6 and the terminal arranged adjacent to the stack manifold 6 and extends like a pipe being laid in a planar direction, the mixed hydrogen gas G3 flowing in the mixed hydrogen gas flow path Rk can be easily heated further and directly by the heat generated by the fuel cell stack 10 and the heat exchange efficiency can be further increased. Furthermore, since the temperature between the stack manifold 6 and the terminal becomes so high as to be close to the temperature of the unit cells 11 during the operation of the fuel cell system 1, it is possible to more reliably prevent the water originating from the hydrogen off-gas G2 contained in the mixed hydrogen gas G3 from freezing.

In addition, the mixed fuel gas flow path Rk is provided between the coolant exit flow path 64b and the oxidant gas exit flow path 66b and the temperatures of the opening of the coolant exit flow path 64b and the opening of the oxidant gas exit flow path 66b in the stack manifold 6 tend to be higher than the temperature of the remaining portion due to exhaust heat from the fuel cell stack 10. Accordingly, it is possible to further enhance the freezing prevention effect of the water contained in the mixed hydrogen gas G2.

Since the point of merger 32c between the hydrogen gas G1 and the hydrogen off-gas G2 is provided at a location in the housing (inside the pump chamber 54) of the pump rotor 51 of the electric circulation pump 37 and downstream from the pump chamber exit 53b, heat from the electric motor 50 of the electric circulation pump 37 is conducted to the housing of the pump rotor 51 so as to thereby further enhance the freezing prevention effect of the water originating from the hydrogen off-gas G2 contained in the mixed hydrogen gas G3. In addition, the configuration in which the point of merger 32c between the hydrogen gas G1 and the hydrogen off-gas G2 is provided in the vicinity of the stack manifold 6 also helps to further ensure that the water originating from the fuel off-gas G2 contained in the mixed hydrogen gas G3 is prevented from freezing.

Since the mixed fuel gas flow path Rk extends from the portion (the outlet port 61a of the stack manifold 6) corresponding to the central part of the fuel cell stack 10 to the mixed fuel gas entry flow path 62, the mixed hydrogen gas G3 is introduced into the fuel cell stack 10 from an area facing the unit cell 11 and the fuel cell stack 10 at a relatively high temperature, in particular, from an area facing the central part of the unit cell 11 and the fuel cell stack 10. Accordingly, it is possible to further enhance the freezing prevention effect of the water originating from the hydrogen off-gas G2 contained in the mixed hydrogen gas G3.

In addition, since the electric circulation pump 37 is directly connected to the surface 6a of the stack manifold 6 without any connecting member or any relay member, such as a pipe, the mountability of the electric circulation pump 37 to the stack manifold 6 can be greatly improved. As a result, economic efficiency can be improved due to a simplified structure and a reduced number of production steps.

Furthermore, since the pump chamber entry 53a and the pump chamber exit 53b are arranged in a vertical line or a substantially vertical line, it is possible to effectively prevent water produced as a result of condensation of water vapor in the hydrogen off-gas G2 from being retained in the flow path for the hydrogen off-gas G2 in the electric circulation pump 37. Accordingly, it is possible to enhance the performance of the draining of water from the pump chamber 54 of the pump rotor 51 after the electric circulation pump 37 is stopped.

Since the mixed fuel gas flow path Rk and the mixed fuel gas entry flow path 62 are configured such that the lowermost surface of the mixed fuel gas flow path Rk (indicated by the dashed line Hk in FIGS. 6 and 7) is located lower than the lowermost surface of the mixed fuel gas entry flow path 62 (indicated by the dashed line H62 in FIG. 7) in the vertical direction, it is possible to effectively prevent the intrusion of fluid droplets (water droplets), from the mixed fuel gas flow path Rk, into the pump chamber 54 of the pump rotor 51 of the electric circulation pump 37 and into each unit cell 11 of the fuel cell stack 10.

It should be noted that the present invention is not limited to the above embodiments and various variations may be made without departing from the gist of the invention discussed earlier. For example, the vertical positional relationship between the pump chamber entry 51a and the pump chamber exit 51b is not particularly limited. However, it is preferable, in consideration of the smooth distribution of the fuel off-gas, to arrange the pump chamber entry 51a on the lower side and the pump chamber exit 51b on the upper side, as shown in FIG. 4. There may be a single fuel cell stack.

INDUSTRIAL APPLICABILITY

As described above, according to the present invention, it is possible to significantly increase the heat exchange efficiency during the process of mixing the fuel off-gas and the new fuel gas and supplying the mixed gas to the fuel cell stack body and it is also possible to more reliably prevent, even if the water in the fuel off-gas freezes and produces ice, the ice from flowing into the stack body. Thus, the present invention can be widely and effectively applied to: all types of fuel cells; vehicles, devices, systems and facilities which include fuel cells; and the manufacture thereof.

DESCRIPTION OF REFERENCE NUMERALS

1: fuel cell system
2: oxidant gas supply system
3: fuel gas supply system (a part thereof also serving as a fuel off-gas circulation system)
4: coolant supply system
6: stack manifold (manifold)
6a: front surface of stack manifold 6
6b: back surface of stack manifold 6
10 fuel cell stack (stack body)
11: unit cell (cell)
12, 13: end plate
14: stack case
20: humidifier 21: air supply pipe
22: air discharge pipe
23: discharge pipe
24: compressor
30: hydrogen tank (fuel supply source)
31: fuel supply pipe
32: circulation pipe
32b: pipe
32c: point of merger
33: regulator having a cutoff valve
34: gas-liquid separator
35: discharge pipe
36: discharge valve
37: electric circulation pump (pump)
41: coolant pipe
42: cooling pump
43: radiator
44: bypass pipe
45: switch valve
50: electric motor
51: pump rotor
52: inlet port
53a: pump chamber entry (entry for fuel off-gas to enter the pump)
53b: pump chamber exit (exit for mixed fuel gas to exit from the pump)
54: pump chamber
61a: inlet port
62b outlet port
63: mixed fuel gas entry flow path
64a: coolant entry flow path
64b: coolant exit flow path
66a: oxidant gas entry flow path
66b: oxidant gas exit flow path
G1: hydrogen gas (fuel gas)
G2: hydrogen off-gas (fuel off-gas)
G3: mixed hydrogen gas (mixed fuel gas)
Hd: lowermost surface of pump chamber exit flow path Rd
Hk: lowermost surface of mixed fuel gas flow path Rk
H62: lowermost surface of mixed fuel gas entry flow path 62
Rd: pump chamber exit flow path
Rk: mixed fuel gas flow path

What is claimed is:

1. A fuel cell system comprising:
a fuel cell that includes a stack including a plurality of cells for generating electric power through electrochemical reaction between a fuel gas and an oxidant gas;
a fuel gas supply system that supplies the fuel gas from a fuel supply source to the stack; and
a fuel off-gas circulation system that resupplies fuel off-gas discharged from the stack to the stack,
wherein the fuel off-gas circulation system includes: a mixed fuel gas flow path formed such that a mixed fuel gas containing the fuel off-gas and the fuel gas flows along a back surface of a manifold installed in the stack; and a point of merger where the fuel off-gas and the fuel gas merge with each other to produce the mixed fuel gas, the point of merger being arranged on an outer surface side of the manifold, the outer surface being opposed to the surface at which the mixed fuel gas flow path is formed, and
wherein the mixed fuel gas flow path is defined between the manifold and a terminal for extracting electric power generated by the stack, which is arranged adjacent to the manifold.

2. The fuel cell system according to claim 1, wherein the mixed fuel gas flow path is formed between: a coolant exit flow path which is provided in the manifold and through which a coolant, having been supplied to the stack, is discharged out of the stack; and an oxidant gas exit flow path which is provided in the manifold and through which the oxidant gas, having been supplied to the stack, is discharged out of the stack.

3. The fuel cell system according to claim 1, wherein the point of merger is provided in the vicinity of the manifold.

4. The fuel cell system according to claim 1, wherein:
the fuel off-gas circulation system includes a pump for circulating the fuel off-gas; and
the point of merger is provided downstream from a pump chamber exit in a housing of the pump.

5. The fuel system according to claim 1, wherein the mixed fuel gas flow path extends from a portion corresponding to a central part of the stack to a fuel gas entry flow path provided on an edge of the manifold.

6. The fuel cell system according to claim 4, wherein the pump is connected directly to the manifold.

7. The fuel cell system according to claim 4, wherein an entry for the fuel off-gas to enter the pump and an exit for the mixed fuel gas to exit from the pump are arranged in a vertical line or a substantially vertical line.

8. The fuel cell system according to claim 4, wherein the mixed fuel gas flow path is formed such that a lowermost surface of the mixed fuel gas flow path is located lower than a lowermost surface of the pump chamber exit flow path of the pump in the vertical direction.

9. The fuel cell system according to claim 5, wherein the mixed fuel gas flow path is formed such that the lowermost surface of the mixed fuel gas flow path is located lower than a lowermost surface of a mixed fuel gas entry flow path in the vertical direction, the mixed fuel gas entry flow path being provided in the manifold in order to supply the mixed fuel gas to the stack.

* * * * *